US008283277B2

(12) United States Patent
Seeber et al.

(10) Patent No.: US 8,283,277 B2
(45) Date of Patent: Oct. 9, 2012

(54) PHOTOACTIVE TIO₂ IN COATING MATERIALS

(75) Inventors: Alexandra Seeber, Mannheim (DE); Götz-Peter Schindler, Ludwigshafen (DE); Katrin Freitag, Ludwigshafen (DE); Ekkehard Jahns, Weinheim (DE); Antonino Raffaele Addamo, Ludwigshafen (DE); Frank Kleine Jäger, Bad Dürkheim (DE); Dirk Klingler, Mannheim (DE)

(73) Assignee: BASF SE (DE)

( * ) Notice: Subject to any disclaimer, the term of this patent is extended or adjusted under 35 U.S.C. 154(b) by 0 days.

(21) Appl. No.: 12/675,300

(22) PCT Filed: Aug. 27, 2008

(86) PCT No.: PCT/EP2008/061220
§ 371 (c)(1),
(2), (4) Date: Feb. 25, 2010

(87) PCT Pub. No.: WO2009/027432
PCT Pub. Date: Mar. 5, 2009

(65) Prior Publication Data
US 2010/0311572 A1    Dec. 9, 2010

(30) Foreign Application Priority Data

Aug. 28, 2007   (EP) .................... 07115107

(51) Int. Cl.

| | |
|---|---|
| *B01J 31/00* | (2006.01) |
| *B01J 21/00* | (2006.01) |
| *B01J 23/00* | (2006.01) |
| *B32B 5/16* | (2006.01) |
| *B32B 9/00* | (2006.01) |
| *B32B 15/02* | (2006.01) |
| *B32B 17/02* | (2006.01) |
| *B32B 19/00* | (2006.01) |
| *B32B 21/02* | (2006.01) |
| *B32B 23/02* | (2006.01) |
| *B32B 27/02* | (2006.01) |
| *C09D 1/00* | (2006.01) |
| *C09D 4/00* | (2006.01) |
| *C09D 101/00* | (2006.01) |
| *C09D 201/00* | (2006.01) |
| *C04B 28/26* | (2006.01) |
| *C04B 35/66* | (2006.01) |
| *B28B 7/28* | (2006.01) |
| *B28B 7/34* | (2006.01) |
| *C08L 93/00* | (2006.01) |
| *C08L 89/00* | (2006.01) |
| *C08L 91/00* | (2006.01) |
| *C08L 95/00* | (2006.01) |
| *C08L 97/00* | (2006.01) |
| *C08L 99/00* | (2006.01) |
| *C09C 1/36* | (2006.01) |
| *C08K 5/00* | (2006.01) |
| *C09B 48/00* | (2006.01) |
| *C09B 67/52* | (2006.01) |

(52) U.S. Cl. ........ 502/159; 502/242; 502/350; 428/403; 106/286.4; 106/287.34; 106/38.6; 106/218; 106/436; 106/445; 106/446; 106/493; 106/495; 106/497; 106/499

(58) Field of Classification Search ............... 502/159, 502/242, 350; 428/403; 106/286.4, 287.34, 106/38.6, 218, 436, 445, 446, 493, 495, 497, 106/499
See application file for complete search history.

(56) References Cited

U.S. PATENT DOCUMENTS

| | | | |
|---|---|---|---|
| 6,791,649 B1 * | 9/2004 | Nakamura et al. ............. 349/137 |
| 7,244,302 B2 * | 7/2007 | Schumacher et al. ......... 106/446 |
| 2006/0116279 A1 * | 6/2006 | Kogoi et al. ................... 502/103 |
| 2007/0157853 A1 | 7/2007 | Grochal |
| 2008/0026183 A1 * | 1/2008 | Vanpoulle et al. ............. 428/143 |
| 2009/0286068 A1 | 11/2009 | Niguma et al. |

FOREIGN PATENT DOCUMENTS

| | | |
|---|---|---|
| JP | 11-181339 A | 7/1999 |
| JP | 11-228873 A | 8/1999 |
| JP | 2005-028575 A | 2/2005 |
| JP | 2006-181490 A | 7/2006 |
| JP | 2006-233343 A | 9/2006 |
| WO | WO-99/01766 A1 | 1/1999 |
| WO | WO-2005/100459 A1 | 10/2005 |
| WO | WO-2007/069596 A1 | 6/2007 |

OTHER PUBLICATIONS

Database WPI; Accession No. 2005-135623; XP 002501463, Jul. 7, 2003.
Database WPI; Accession No. 2006-624086; XP 002501462, Feb. 22, 2005.
Database WPI; Accession No. 2007-689318; XP 002501464, Dec. 13, 2005.
U.S. Appl. No. 12/675,432, filed Feb. 26, 2010, Alexandra Seeber et al.

* cited by examiner

*Primary Examiner* — Patricia L Hailey
(74) *Attorney, Agent, or Firm* — Connolly Bove Lodge & Hutz LLP

(57) ABSTRACT

The present invention relates to a coating material comprising
(A) at least one binder as component (A) and
(B) at least one photocatalytically active particle comprising a core composed of at least one first substance having a diameter of 0.1 to 1 μm and at least one envelope at least partly surrounding the core and composed of at least one second substance having an average layer thickness of 0.1 to 10 nm as component (B).

18 Claims, No Drawings

PHOTOACTIVE TIO₂ IN COATING MATERIALS

CROSS-REFERENCE TO RELATED APPLICATIONS

This application is a national stage application (under 35 U.S.C. §371) of PCT/EP2008/061220, filed Aug. 27, 2008, which claims benefit of European application 07115107.0, filed Aug. 28, 2007 which are incorporated by reference.

BACKGROUND OF THE INVENTION

The present invention relates to a coating material comprising at least one binder and at least one photocatalytically active particle, to a process for producing this coating material and to the use of this coating material.

Coating materials comprising photocatalytically active particles are already known from the prior art.

JP 11 181339 A discloses a hydrophilic coating for metals, polymers, concrete, comprising photocatalytically active titanium dioxide particles. The titanium dioxide particles described in JP 11 181339 A have a particle diameter of 1 to 100 nm, comprise particles of $SnO_2$ and are silica and/or silicone coated. The layer thickness of this coating of silica and/or silicone is not disclosed. The coating material prevents soiling of a surface coated with this material. A surface thus treated further has self-cleaning properties when rained upon. Therefore, the coating materials described in JP 11 181339 A are suitable for coating surfaces of buildings, window frames and other goods.

JP 2006-18 14 90 discloses a coating method for coating materials. A photocatalyst consisting of titanium dioxide, zirconium dioxide, zinc oxide, tin oxide, cerium oxide, antimony oxide, indium oxide doped with tin, tin oxide doped with antimony is applied with a nonaqueous solvent to the surfaces to be protected. In a preferred embodiment, a photocatalyst consisting of titanium dioxide is coated with ceramics such as apatite, silica, activated carbon, activated alumina or porous glass to secure the photocatalyst to the surface to be treated. The process described in this document is complicated by the necessity of having to apply at least two layers.

JP 2006-233343 discloses a liquid photocatalyst composition for coating textiles which comprise photocatalyst particles having a preset particle diameter and a coating. The size of these photocatalyst particles is 0.5 to 10 µm. In a preferred embodiment, the core of the photocatalyst particle consists of titanium dioxide and the envelope consists of silica. Envelope thickness and porosity are not disclosed for the photocatalytically active particle.

JP 11228873 A discloses a paint composition comprising titanium dioxide particles coated with porous silica and having photocatalytic properties. The composition further comprises titanium dioxide pigment and an organic resin binder. JP 11228873 A does not disclose the particle diameters of the photocatalytically active particles or the thickness of the silica layer.

WO 2005/100459 A1 discloses a coating material comprising a binder and at least one filler comprising particles having a size and/or surface roughness of 100 µm or less and also a catalytically active agent, the binder being at least partly degraded by the photocatalytic effect and a microstructured, self-cleaning surface is formed. The photocatalytically active agent used in WO 2005/100459 is an oxide of titanium, zinc, iron, manganese, molybdenum and/or tungsten, which comprises at least one additive selected from C, N, S and/or from a transition metal oxide and/or transition metal halide. WO 2005/100459 A1 does not disclose the particle size of the photocatalytically active particles.

Prior art coating materials comprise photocatalytically active particles having the disadvantage that not just the soils present on the coating material in use are photocatalytically degraded, which is desired, but also the binder present in the coating material. This is not desired and the photocatalytic destruction of the organic matrices described in the prior art lower the photoactivity of the surface produced. Not only the photoactivity but also the durability or resistance of the coating materials according to the prior art is inadequate as a result.

BRIEF SUMMARY OF THE INVENTION

It is an object of the present invention to provide a coating material whereby soil present on the coating material is degraded and removed by the coating material or whereby superhydrophilic surfaces are produced and whereby at the same time the coating material has a high resistance to light and weathering effects.

We have found that these objects are achieved by a coating material comprising
(A) at least one binder as component (A) and
(B) at least one photocatalytically active particle comprising a core composed of at least one first substance having a diameter of 0.1 nm to 1 µm and at least one envelope at least partly surrounding the core and composed of at least one second substance having an average layer thickness of 0.1 to 10 nm as component (B).

Herein, coating material refers to a mixture of substances which is suitable for application to various materials and for forming a corresponding, firm coating. Customary coating materials as well as the components mentioned may comprise further components, for example solvents, surfactants, dyes, fillers, pigment dispersants, defoamers and polymers. Materials which can be coated with coatings can be provided for exterior or interior applications, consist of metal, inorganic or organic materials.

The two mandatory components and optional components of the coating material of the present invention will now be more particularly elucidated.

Component (A):

Component (A) of the coating material according to the present invention comprises at least one binder. In a preferred embodiment, the binder used as component (A) is selected from the group consisting of water- and/or organic solvent-based plastics dispersions based on nonpolymeric crosslinking systems, acrylates, caprolactam, vinylcaprolactam, N-vinylformamide, acrylic esters, styrene/acrylic esters and vinyl acetates, polyurethanes, epoxy resins, alkyd resins and mixtures thereof. Nonpolymeric crosslinking systems useful as component (A) are multifunctional methylol derivatives of urea and substituted ureas, melamine, dimethylolurea or N,N'-bis(hydroxymethyl)urea, methylol derivatives of melamine which consist of up to six methylol groups per molecule, preferably those in which the methylol groups are partly or wholly changed into methoxymethyl groups, 1,3-bis(hydroxymethyl)tetrahydro-2-(1H)-pyrimidinone, triazones such as hydroxyethyltriazone, 5-hydroxy-1,3-bis(hydroxymethyl)hexahydro-s-triazin-2-one, urons such as tetrahydro-3,5-bis(hydroxymethyl)-4H-1,3,5-oxadiazin-4-one, methylol derivatives of carbamates, preferably methyl carbamate and methoxyethyl carbamate, methylol derivatives of dihydroxyethyleneurea, dimethyloldihydroxyethyleneureas (DMDHEU), dimethyldihydroxyethyleneureas, 4,5-dihydroxy-1,3-dimethyl-2-imidazolidinone, polycarboxy acids such as citric acid and butanetetracarboxy acid. Polyacrylates useful herein as component (A) are obtainable for example by copolymerization of at least one C1-C10-alkyl(meth)acrylate, for example methyl acrylate, ethyl acrylate, n-butyl acrylate, n-butyl methacrylate, 2-ethylhexyl acrylate, with at least one further comonomer, for example a further C1-C10-alkyl(meth)acrylate, (meth)acrylic acid, (meth)acrylamide, N-methylol(meth)acrylamide, glycidyl (meth)acrylate or a vinylaromatic compound such as for example styrene. Preferably anionic polyurethanes useful herein as component (A) are obtainable for example by reaction of one or more aromatic or preferably aliphatic or cycloaliphatic diisocyanate with one or more polyester diols and preferably one or more hydroxy carboxylic acids, for example hydroxyacetic acid, or preferably dihydroxy carboxylic acids, for example 1,1-dimethylolpropionic acid, 1,1-dimethylolbutyric acid or 1,1-dimethylolethanoic acid. Ethylene-(meth)acrylic acid copolymers particularly useful as component (A) are obtainable for example by copolymerization of ethylene, (meth)acrylic acid and if appropriate at least one further comonomer such as for example C1-C10-alkyl (meth)acrylate, maleic anhydride, isobutene or vinyl acetate, preferably by copolymerization at temperatures in the range from 190 to 350° C. and pressures in the range from 1500 to 3500 and preferably 2000 to 2500 bar. Ethylene-(meth)acrylic acid copolymers particularly useful as component (A) may comprise for example up to 90% by weight of ethylene in copolymerized form and have a melt viscosity in the range from 60 mm$^2$/s to 10 000 mm$^2$/s and preferably 100 mm$^2$/s to 5000 mm$^2$/s, measured at 120° C. Ethylene-(meth)acrylic acid copolymers particularly useful as component (A) may comprise for example up to 90% by weight of ethylene in copolymerized form and have an MFR melt flow rate in the range from 1 to 50 g/10 min, preferably 5 to 20 g/10 min, more preferably 7 to 15 g/10 min, measured at 160° C. and a load of 325 g in accordance with EN ISO 1133. Copolymers particularly useful as component (A) of at least one vinylaromatic with at least one conjugated diene and if appropriate further comonomers, for example styrene-butadiene binder, comprise at least one ethylenically unsaturated carboxylic acid or dicarboxylic acid or a suitable derivative, for example the corresponding anhydride, in copolymerized form. Particularly useful vinylaromatics are para-methylstyrene, α-methylstyrene and especially styrene. Particularly useful conjugated dienes are isoprene, chloroprene and particularly 1,3-butadiene. Particularly useful ethylenically unsaturated carboxylic acids or dicarboxylic acids or suitable derivatives thereof include for example (meth)acrylic acid, maleic acid, itaconic acid, maleic anhydride and itaconic anhydride. It is further possible to use potassium waterglass, in particular for silicate colors, and further customary binders known to one skilled in the art for exterior colors, interior colors, coatings for industrial applications, technical apparatus and specialty coatings.

Component (A) is generally present in an amount ranging from 5% to 99.9% by weight. When the coating material of the present invention is used for exterior applications, then component (A) is preferably in an amount ranging from 5% to 99.9% by weight and more preferably present in an amount ranging from 5% to 98% by weight. When the coating material of the present invention is used for interior applications, then component (A) is preferably present in an amount ranging from 5% to 99.5% by weight and more preferably in an amount ranging from 5% to 98% by weight.

Component (B):

Component (B) of the coating material according to the present invention comprises at least one photocatalytically active particle, comprising a core composed of at least one first substance having a diameter of 0.1 nm to 1 μm and at least one envelope at least partly surrounding the core and composed of at least one second substance having a thickness of 0.1 to 10 nm.

Component (B) is generally present in the coating material of the present invention in an amount ranging from 0.1% to 10% by weight. When the coating material of the present invention is used for exterior applications, then component (B) is preferably present in an amount ranging from 0.1% to 8% by weight and more preferably in an amount ranging from 0.5% to 5% by weight. When the coating material of the present invention is used for interior applications, then component (B) is preferably present in an amount ranging from 0.5% to 10% by weight and more preferably in an amount ranging from 2% to 8% by weight.

In a preferred embodiment, the core of the photocatalytically active particle comprises at least one metal oxide or semimetal oxide and the at least one envelope of the nanoparticle comprises at least one further metal oxide or semimetal oxide.

Useful metals or semimetals whose oxides are present in the core of the at least one photocatalytically active particle present as component (B) are generally selected from the group consisting of elements of groups I to XV of the periodic table (in accordance with IUPAC), lanthanides, actinides and mixtures thereof, more preferably from the group consisting of V, Ti, Zr, Ce, Mo, Bi, Zn, Mn, Si, Ba, Au, Ag, Pd, Pt, Ru, Rh, La and mixtures thereof.

A particularly preferred metal or semimetal oxide present in the core of component (B) is $TiO_2$, which is essentially in the anatase form, i.e., preferably more than 50% of the $TiO_2$ present and more preferably 60 to 65% of the $TiO_2$ present is in the anatase form.

The at least one envelope present in component (B) comprises in a preferred embodiment metal or semimetal oxides comprising elements of groups I to XV of the periodic table (in accordance with IUPAC), lanthanides, actinides and mixtures thereof, more preferably selected from the group consisting of V, Ti, Zr, Ce, Mo, Bi, Zn, Mn, Si, Ba, Au, Ag, Pd, Pt, Ru, Rh, La and mixtures thereof. Very particularly preferred metal or semimetal oxides present in the at least one envelope of component (B) are $SiO_2$, ZnO, $CeO_2$, $TiO_2$, SnO or mixtures thereof.

In a preferred embodiment of the coating material of the present invention, component (B) has a core of $TiO_2$ and an envelope of $SiO_2$.

The photocatalytically active particles present as component (B) in the coating material of the present invention preferably have a narrow particle size distribution. Narrow particle size distribution herein is to be understood as meaning that preferably ≧70%, more preferably ≧80% and most preferably ≧90% of the particle sizes are in a range which differs from the average particle size by no more than 20 nm, preferably by no more than 15 nm and more preferably by no more than 10 nm.

The core-envelope nanoparticles have a nonporous core and a porous coating. Coating porosity and thickness are adjustable to specific values, making it possible to tailor the catalytic activity of the core specifically to the coating material of the present invention and the corresponding requirements. The porosity of the $SiO_2$ layer is measured via XPS (X-ray Photo Electron Spectroscopy—ESCA Electron Spectroscopy for Chemical Analysis). It is thus possible to adjust the activity of the core-envelope particles such that soils adhering to the coating material of the present invention are catalytically degraded, while the binder present in the coating of the present invention is essentially not catalytically degraded.

Photoactivity against fluidic noxiants and pollutants, for example soils adhering to the coating, is more than 60% of the photoactivity of a standard photocatalyst (Degussa P25), more preferably more than 70% and most preferably more than 80%. Photoactivity against fixed matrices, i.e., the at least one binder present as component (A) in the coating of the present invention, is preferably less than 50% of the photoactivity of a standard photocatalyst (Degussa P25), more preferably less than 40% and most preferably less than 30%.

In a preferred embodiment, component (B) in the coating material of the present invention is active with regard to soils and nonactive with regard to matrix materials.

The core of the photocatalytically active particle used as component (B) has a diameter in the range from 0.1 nm to 1 µm and the envelope of the particle has an average layer thickness in the range from 0.1 to 10 nm. The core has a diameter of at least 0.1 nm. In a preferred embodiment, the diameter of the core is in the range from 1 to 200 nm and more preferably in the range from 5 to 50 nm. In a further preferred embodiment, the average layer thickness of the envelope is in the range from 0.1 to 5 nm and more preferably in the range from 1 to 3 nm.

The porosity of the envelope of the photocatalytically active particle used according to the present invention as component (B) can be expressed by the ratio of the proportion of metal in the envelope, for example Si, in atom percent to the proportion of the metal in the core, for example Ti, in atom percent and is preferably in the range from 2 to 80, more preferably in the range from 5 to 60 and particularly preferably in the range from 8 to 40, all measured by XPS (X-Ray Photo Electron Spectroscopy-ESCA Electron Spectroscopy for Chemical Analysis).

The photocatalytically active particles preferably used as component (B) in the coating material of the present invention can be produced by any process known to one skilled in the art. Processes useful for producing the photocatalytically active particles used according to the present invention include for example the wet-chemical sol-gel processes and the flame synthesis processes. These processes are known to one skilled in the art.

Component (C):

The coating material of the present invention comprises a pigment as component (C), if appropriate.

The coating material of the present invention may utilize any suitable pigments for this application known to one skilled in the art. In a preferred embodiment, the coating material of the present invention comprises as component (C) at least one pigment selected from the group consisting of titanium dioxide, barium sulfate, zinc oxide, colored pigments such as iron oxides, carbon black, zinc yellow, zinc green, ultramarine, luminescent or fluorescent pigments, or azo pigments, isoindolinone pigments, isoindoline pigments, phthalocyanine pigments, quinacridone pigments, perinone pigments, perylene pigments, anthraquinone pigments, diketopyrrolopyrrole pigments, thioindigo pigments, dioxazine pigments, triphenylmethane pigments, quinophthalone pigments and mixtures thereof.

A suitable pigment is obtainable for example as $TiO_2$ in the rutile form.

Component (C) is preferably present in an amount ranging from 5% to 30% by weight and preferably in an amount ranging from 10% to 20% by weight.

The coating material of the present invention generally comprises 30% to 75% by weight and preferably 40% to 65% by weight of nonvolatile constituents. This is to be understood as referring to all constituents of the coating other than water, but at least the total amount of binder (component (A)), if appropriate pigment, if appropriate filler (component (E)) and polymeric assistants.

Component (D):

The coating material of the present invention may comprise a solvent as component (D), if appropriate.

Component (D) in the coating material of the present invention may utilize any solvents and solvent mixtures known and suitable for the present application.

In a preferred embodiment, the solvent present as component (D) is essentially water. Essentially here is to be understood as meaning that preferably at least 75% by weight of the solvent is water and more preferably at least 90% by weight.

Volatile organic solution- and film-forming assistants can be added to the color formulation to improve filming, in particular at low temperatures, in the course of processing. Examples of organic solution- and film-forming assistants are volatile hydrocarbons such as benzine fractions, white oils, liquid paraffins, glycols such as butylene glycol, ethylene glycol, diethylene glycol and propylene glycol, glycol ethers such as glycol butyl ether, diethylene glycol monobutyl ether, 1-methoxy-2-propanol, dipropylene glycol methyl ether, dipropylene glycol propyl ether, dipropylene glycol n-butyl ether, tripropylene glycol n-butyl ether, 2,3-phenoxypropanol, glycol esters and glycol ether esters such as butyl glycol acetate, diethylene glycol mono-n-butyl ether acetate, 2,2,4-trimethylpentane-1,3-diol monoisobutyrate and the like, and also organic plasticizers (organic liquids having a boiling point above 250° C.), such as dibutyl phthalate, dioctyl phthalate, tributoxyoctyl phosphate, 2,2,4-trimethylpentane-1,3-diol diisobutyrate and polypropylene glycol alkylphenyl ether and also—owing to the manufacturing process—nonpolymerized monomers, so-called residual monomers. Film-forming assistant identity and amount is to be selected according to the intended use.

Component (D), if present, is present in an amount ranging from 0.1% to 75% by weight.

The coating material of the present invention comprises at least one filler as component (E), if appropriate. This at least one filler in the coating material of the present invention generally has the office of raising the viscosity of the coating material (which is preferably to be applied in liquid form to the material to be coated) to ensure good processability.

In a preferred embodiment, the at least one filler is selected from the group consisting of minerals, for example inorganic salts of alkali and alkaline earth metals, and also of the transition metals and the other metals and semimetals of the main groups of the periodic table, for example Mg, Ca and/or Si. By way of anions, these salts preferably comprise oxide, carbonate, bicarbonate, sulfate, halide and nitrogenous anions, preferably chloride and/or oxide anions. Suitable fillers comprise aluminosilicates, such as feldspars, silicates, such as kaolin, talc, mica, wollastonite, magnesite, alkaline earth metal carbonates, such as calcium carbonate, for example in the form of calcite or chalk, magnesium carbonate, dolomite, alkaline earth metal sulfates, such as calcium sulfate, silicon dioxide, etc. The fillers can be used as individual components. In practice, filler mixtures will be found particularly advantageous, examples being calcium carbonate/kaolin, calcium carbonate/talc. Suitable fillers for use as component (E) in the coating material of the present invention are known to one skilled in the art.

Component (E), if present, is present in the coating material of the present invention in an amount ranging from 10% to 40% by weight and preferably ranging from 15% to 30% by weight, all based on the entire coating material.

The pigment volume concentration PVC of the coating material of the present invention is in the range from 20 to 65. For example, the PVC in coating materials in the form of emulsion paints for exterior applications is preferably in the range from 20 to 60, especially in the range from 30 to 60 and specifically in the range from 35 to 59.

To enhance hiding power and to save white pigments, emulsion paints having a supercritical formulation (highly filled paints; PVC>PVC critical) frequently utilize finely divided fillers, for example finely divided calcium carbonate or mixtures of various calcium carbonates having different particle sizes. Hiding power, hue and depth of shade are preferably standardized using blends of color pigments and fillers.

The coating material of the present invention comprises at least one pigment dispersant as component (F), if appropriate.

Component (F) is generally a homo- or copolymer constructed from ethylenically unsaturated monomers which are free-radically polymerized. Examples of suitable monomers are $\alpha,\beta$-unsaturated mono- and dicarboxylic acids, for example acrylic acid, methacrylic acid, fumaric acid, maleic acid, itaconic acid, and their mono- or diesters with aliphatic or aromatic mono- or polyhydric alcohols having 1 to 12 carbon atoms, such as methanol, ethanol, propanols, such as isopropanol, n-propanol, butanols, such as n-butanol, isobutanol, tert-butanol and cyclohexanol. Further suitable monomers are ethylenically unsaturated, aromatic monomers such as styrene, $\alpha$-methylstyrene. Further suitable monomers also include the salts of the aforementioned acids of monovalent cations, for example ammonium acrylate.

Component (F) of the coating material of the present invention preferably utilizes homo- and copolymers based on acrylic esters, for example butyl acrylate and/or styrene. Suitable pigment dispersants for use as component (F) in the coating material of the present invention are known to one skilled in the art.

Component (F), if present, is present in the coating material of the present invention in an amount ranging from 0.1% to 5% by weight and preferably ranging from 0.2% to 3% by weight, all based on the entire coating material.

The coating material of the present invention comprises at least one thickener as component (G), if appropriate.

Component (G) is present in the coating material of the present invention, if appropriate, to adjust the viscosity of the material and so improve the processability for example.

Examples of substances useful according to the present invention as component (G) are for example aqueous solutions based on methylcellulose or cellulose. These aqueous solutions generally have a concentration in the range from 0.1% to 10% by weight. The viscosity of the aqueous solutions used as a thickener is generally in the range from 5000 to 30 000 mPas, for example 15 000 to 25 000 mPas, at room temperature. The thickeners can also be incorporated in the coating material of the present invention without solvent.

When component (G) is incorporated as an aqueous solution in the coating material of the present invention, then the amount of this solution, if present, is in the range from 2% to 20% by weight and preferably in the range from 8% to 15% by weight, all based on the entire coating material. When component (F) is incorporated without solvent, this is accomplished in an amount ranging from 0.1% to 2% by weight and preferably ranging from 0.2% to 1.5% by weight, all based on the entire coating material.

The coating material of the present invention may incorporate as components (H) one or more substances selected from the group consisting of water softeners, dispersing assistants, agents for setting the pH, emulsifiers, preservatives, surfactants, foamers, defoamers, polymers and mixtures thereof.

Components performing the aforementioned offices in the coating of the present invention are known to one skilled in the art and commercially available.

Examples of water softeners which also function as dispersing assistants are phosphonates and phosphates, an example being sodium polyphosphate.

Examples of agents for setting the pH are organic, aqueous or solid acids and bases, preferably medium bases, for example $NH_3$ in aqueous solution.

Anionic, cationic or preferably nonionic surface-active substances can be used as an emulsifier. Examples of suitable cationic emulsifiers are for example C6-C18-alkyl-, -aralkyl- or heterocyclyl-containing primary, secondary, tertiary or quaternary ammonium salts, alkanolammonium salts, pyridinium salts, imidazolinium salts, oxazolinium salts, morpholinium salts, thiazolinium salts and also salts of amine oxides, quinolinium salts, isoquinolinium salts, tropylium salts, sulfonium salts and phosphonium salts. By way of example there may be mentioned dodecylammonium acetate or the corresponding hydrochloride, the chlorides or acetates of the various 2-(N,N,N-trimethylammonio)ethylparaffinic esters, N-cetylpyridinium chloride, N-laurylpyridinium sulfate and also N-cetyl-N,N,N-trimethylammonium bromide, N-dodecyl-N,N,N-trimethylammonium bromide, N,N-distearyl-N,N-dimethyl ammonium chloride and also the Gemini surfactant N,N'-(lauryldimethyl)ethylenediamine dibromide. Examples of suitable anionic emulsifiers are alkali metal and ammonium salts of alkyl sulfates (alkyl radical: C8 to C12), of sulfuric acid monoesters formed from ethoxylated alkanols (degree of ethoxylation in the range from 4 to 30, alkyl radical: C12-C18) and from ethoxylated alkylphenols (degree of ethoxylation in the range from 3 to 50, alkyl radical: C4-C12), of alkylsulfonic acids (alkyl radical: C12-C18), of alkylarylsulfonic acids (alkyl radical: C9-C18) and of sulfosuccinates such as for example sulfosuccinic mono- or diesters.

Surfactants can be used in the coating material of the present invention to enhance the compatibility of the coating material with the surfaces to be coated and/or to improve the storage stability.

Defoamers are added if appropriate to avoid the coating material of the present invention foaming up in the course of processing and/or transportation.

Component (H), if present, is preferably present in the coating material of the present invention in a total amount ranging from 1% to 30% by weight and preferably from 2% to 25% by weight, all based on the entire coating material of the present invention.

The amounts of components A and B and optionally C, D, E, F, G and/or H being present in the coating material according to the present invention add up to 100% by weight.

The present invention also provides a process for producing a coating of the present invention, wherein components (A) and (B) and if appropriate (C), (D), (E), (F), (G) and/or (H) are mixed.

Mixing in a preferred embodiment takes place at a temperature in the range from 5 to 40° C. and more preferably at a temperature in the range from 15 to 35° C.

In accordance with the present invention, the photocatalytically active particles (component (B)) are mixed with the coating material before processing, i.e., before the surfaces to be coated are coated with the coating, and are not applied to the coating material until after the coating material has been applied, for example by spray coating, to the material to be coated.

In a further preferred embodiment, all the components of the coating material of the present invention except for the photocatalytically active particle are mixed and the at least one photocatalytically active particle is incorporated as last component into the mixture of the other components.

The present invention also provides for the use of the coating material of the present invention for coating metallic, organic and inorganic materials for interior and exterior applications for technical apparatus.

The present invention also provides for the use of the coating material of the present invention for coating metallic, organic and inorganic materials for interior and exterior applications in building construction chemistry.

The present invention provides for the use of the coating material of the present invention in applications comprising soil-degrading, deodorizing, air-cleaning, water-cleaning, antibacterial, superhydrophilicizing and/or antifogging effects.

More particularly, the present invention provides for the use of the coating material of the present invention for coating materials selected from the group consisting of building construction materials, packaging materials, water- and air-cleaning appliances, wallpapers, plastics, interior and exterior lighting, devices, glass products, household appliances, agricultural materials/equipment, tools, agricultural objects, tableware such as dishware and cutlery, bath products, toilet articles, furniture, filters, machine covers, vehicle covers, roofs, roof covers, roof gutters, window and door frames, automotive parts, motor vehicles, rail vehicles, airplanes, spaceships, containers, bicycles, motorcycles, display panels, traffic signs, wallpaper, noise control walls, greenhouses, insulators, reflection panels, solar cells, solar water heaters, statues, fences, terraces, ventilators, air conditioners, bench, shutters, display board, mirror, lenses, for example eyeglass, optical lenses, camera lens, endoscopic lens, lens for manufacturing semiconductors, prism, helmets, masks, badges, textiles (wovens and nonwovens), leather products, paper products, sports implements, health instruments, medicinal goods, containers, pipes, cables, sanitary products and so on.

A specific aspect of the present invention is the use of a coating material of the present invention for coating textiles. Textiles in the sense of the present invention are in the realm of the present invention to be understood as meaning textile fibers, textile intermediate and end products and finished articles manufactured therefrom which, as well as textiles for the apparel industry, also comprise for example carpets and other home textiles and also textile structures for industrial purposes. These also include unshaped structures such as for example staples, linear structures such as twine, filaments, yarns, lines, strings, cordage, threads, and also three-dimensional structures such as for example felts, wovens, formed-loop knits, nonwovens and waddings. Textiles can be of natural origin, for example cotton, silk, cashmere, wool, leather, felt or flax, or synthetic, for example polyamide, polyester, polyurethane, modified polyester, polyester blend fabric, polyamide blend fabric, polyacrylonitrile, polyolefin, triacetate, acetate, polycarbonate, polypropylene, polyvinyl chloride or polyester microfibers. Textiles in the sense of the present invention can be organic materials or else inorganic materials such as in particular glass fibers, carbon fibers, metal fibers and glass fiber fabric.

Textiles in the sense of the present invention can be used in the interior or exterior sector. Examples of textiles in the interior sector are drapes, furniture, carpets, upholstery, tablecloth, shutters, pads, baskets, bags, sacks, notions, toys, cloths, suitcases, wall carpets, seat covers, mattress, blankets, toilet seat covers, soft floor mats, bedding, wallpaper, rugs, clothing and filters. Examples of textiles in the exterior sector are awnings, umbrellas, parasols, hot air balloons, tarpaulins, fabric covers, garden furniture, tents, banners, flag cloths, artificial lawns, cordage, nets, sportswear, flags, colors, sails, workwear, neoprene suits, roof covers, signage, concealers, circus tents, machine covers, vehicle covers, fish pond covers, swimming pool covers and technical textiles for nautical, medical, industrial, aeronautical and leisure applications.

EXAMPLES

Example 1

Production of Inventive Wall Paint I

TABLE 1

| No. | Ingredient | Function | Parts by weight |
|---|---|---|---|
| 1 | Water | Solvent | 125.0 |
| 2 | Ammonium polyacrylate 30% | Pigment dispersant | 3.0 |
| 3 | Sodium polyphosphate | Water softener, dispersant | 4.0 |
| 4 | Ammonia (conc.) | pH control | 2.0 |
| 5 | Waterborne combination of chloromethyl-1-methylisothiazolones and N-/O-formals ("Parmetol A 26 ®", Schülke & Mayr) | Preservative | 3.0 |
| 6 | Methylcellulose, 20000 mPas, 2% solution | Thickener | 130.0 |
| 7 | Universal benzine (180-210° C.) | Solvent, film-forming assistant | 13.0 |
| 8 | Diisobutyl ester of a dicarboxylic acid mixture | Solvent, film-forming assistant | 7.0 |
| 9 | Oleyl-$EO_{30}$-H | Nonionic surfactant | 10.0 |
| 10 | Rutile titanium dioxide | Pigment | 150.0 |
| 11 | Calcium carbonate, about 12 μm ("Omyacarb 5 GU ®", Omya) | Filler, 90% $CaCO_3$ | 180.0 |
| 12 | Precipitated calcium carbonate, about 200 mm primary particle ("Socal P 2 ®", Solvay) | Filler, 100% $CaCO_3$ | 100.0 |

TABLE 1-continued

| No. | Ingredient | Function | Parts by weight |
|---|---|---|---|
| 13 | Talc | Filler, 60% $SiO_2$, 30% MgO | 50.0 |
| 14 | Combination of liquid hydrocarbons, hydrophobic silica, synth. copolymers and nonionic emulsifiers ("Agitan 280 ®", Münzing) | Defoamer | 3.0 |
| 15 | 50%, 100 nm Ø, about 1000 mPas, MFT 20° C. ("Acronal 290 D ®", BASF AG) | Aqueous dispersion of a polymer | 220 |
|  | Total |  | 1000.0 |
|  | Solids content | Solid constituents based on total weight | 60% |
|  | PVC | Ratio of (pigment volume + filler volume) to (pigment volume + filler volume + dispersion volume) | 60% |

Table 1 indicates the composition of wall paint I.

The inventive photocatalyst used was $TiO_2$ in the anatase form in the core surrounded by porous $SiO_2$ as envelope. The diameter of the core was 5 to 20 nm, the thickness of the envelope was 1 to 2 nm. The amount of Si based on the entire particle was 1.1% by weight. The porosity of the envelope was 11.9.

This photocatalyst was incorporated in the wall paint at room temperature and a relative humidity of 50 to 60%. This inventive wall paint I was blade coated (90 μm) onto a glass substrate. The concentration of the photocatalyst was 1 to 50 g/kg, in the present example 43 g/kg. The layer was dried at 20-60° C. between 0.5 and 10 hours.

Corresponding wall paints were also produced each comprising an addition of a standard photocatalyst (Degussa P25) instead of the inventive layered photocatalyst.

A wall paint without added photocatalyst was also produced.

Example 2

Decolorization Tests

The photoactivity of the produced wall paints I against the dye of the wall paint was determined by determining the photocatalytic decolorization by UV-vis measurements. The total duration of the tests to verify the photocatalytic decolorization of the wall paint under UV irradiation was 6 months. The wall paints produced by the method described in Example 1 were blade coated (90 μm) onto a glass substrate and irradiated with UV light at room temperature for 6 months. UV intensity was 1.5 $mW/cm^2$.

Blank tests were carried out for decolorizing the wall paint under UV irradiation with addition of a standard photocatalyst (Degussa P25) instead of the inventive layered photocatalyst.

Blank tests were also carried out for decolorizing the wall paint under UV irradiation without addition of a photocatalyst.

The results are reported in Table 2.

TABLE 2

| Wall paint sample I | Visual inspection of sample |
|---|---|
| Blank sample (wall paint I without catalyst) | No change to green color |
| Wall paint I with standard photocatalyst Degussa P25 | Clear white strips in green color |
| Wall paint I with inventive $SiO_2$-coated $TiO_2$ photocatalyst | No change to green color |

Example 3

Production of Inventive Wall Paint II

TABLE 3

| No. | Ingredient | Function | Amount in parts by weight |
|---|---|---|---|
| 1 | Water | Solvent | 45.0 |
| 2 | High molecular hydroxyethylcellulose (2000 mPas for 1% solution) | Thickener | 0.6 |
| 3 | Aqueous sodium hydroxide solution 20% | pH control | 0.3 |
| 4 | Copolymer of butyl acrylate and acrylic acid, dissolved in ammonia water, 30% | Pigment dispersant | 2.4 |
| 5 | Sodium polyphosphate | Water softener, dispersing assistant | 0.3 |
| 6 | Waterborne combination of chloromethyl-1-methylisothiazolones and N-/O-formals ("Parmetol A 26 ®", Schülke & Mayr) | Preservative | 0.2 |
| 7 | Mixture of foam-destroying polysiloxanes and hydrophobic solids in polyglycol ("Byk 022 ®", Byk Chemie) | Defoamer | 0.3 |
| 8 | Anatase titanium dioxide enveloped with $SiO_2$, inventive | Photocatalyst | 12.0 |

TABLE 3-continued

| No. | Ingredient | Function | Amount in parts by weight |
|---|---|---|---|
| 9 | Rutile titanium dioxide | Pigment | 10.5 |
| 10 | Very finely divided aluminum silicate with 9.5% Al as $Al_2O_3$ and 8% Na as $Na_2O$ with medium oil absorption and very high whiteness ("Sipernat P 820 ®", Degussa) | Filler, $Al_2O_3$ 10%, $SiO_2$ 80% | 6.0 |
| 11 | Talc ("Westmin 30 E ®", Mondo Minerals), 12 μm | Filler, $SiO_2$ 60%, MgO 30% | 3.0 |
| 14 | Mica ("Micro Mica W1 ®", Norwegian Talc AIS), 3.4 μm | Filler, $Al_2O_3$ 30%, $SiO_2$ 50%, MgO 15% | 7.5 |
| 15 | Calcium carbonate, about 3 μm ("Omyacarb 2 GU ®", Omya) | Filler, $CaCO_3$ 100%, small particles | 9.8 |
| 16 | Calcium carbonate, about 12 μm ("Omyacarb 5 GU ®", Omya) | Filler, $CaCO_3$ 100%, medium particles | 24.8 |
| 17 | 50%, 150 nm Ø, about 50 mPas, MFT 4° C. ("Acronal DS 6255 ®", BASF AG) | Aqueous dispersion of polymer of acrylic ester and styrene | 27 |
| 18 | Mixture of hydrophobic components in paraffinic mineral oil, silicone-containing ("Byk 038 ®", Byk Chemie) | Defoamer for emulsion paints | 0.3 |
| | Total | | 150.0 |

Table 3 indicates the ingredients of wall paint II.

Example 4

Soiling Tests with Wall Paint II

The photoactivity of wall paint II was measured. The wall paint was blade coated (125 μm) onto a Leneta film. After 24 h, a further layer was blade coated on top using the same gap height. The film was dried for 7 days in a conditioning chamber. The wall paint was activated for 25 h by irradiation in a Suntest instrument (from Atlas, model CPS+, black panel standard 75° C., light intensity 765 W/m², no filter). Dirt such as coffee, mustard, lipstick and wall chalk was applied and left to soak in for 30 minutes. The dirt was wiped off with a cloth and then rinsed off with water. The sample was left to dry at room temperature for 24 h and irradiated in the Suntest for 250 hours.

Blank tests were carried out to degrade soils under UV irradiation with addition of a standard photocatalyst (Degussa P25) instead of the inventive layered photocatalyst.

Blank tests were also carried out to degrade soils under UV irradiation without addition of a photocatalyst. The results are reported in Table 4.

TABLE 4

| Wall paint sample II | Self-cleaning properties (% degradation) | | | |
|---|---|---|---|---|
| | Mustard | Coffee | Lipstick | Wall chalk |
| Blank sample (wall paint II without catalyst) | Soil remains unchanged on the surface | | | |
| Wall paint II with standard photocatalyst Degussa P25 | >60% | >60% | >20% | >10% |
| Wall paint II with inventive $SiO_2$-coated $TiO_2$ photocatalyst | >90% | >90% | >95% | >30% |

Example 5

Chalking Test

The chalking of wall paint II was determined via the Kempf method. To swell the gelatin layer, thin photopaper with a shiny surface was placed in a dish with water for 4 minutes and dried with nonshedding filter paper. The photopaper was placed with the gelatin layer on the coat to be tested. A stamper was placed on the paper and the covered test coat was stressed with a force of 250 N over an area of 40 mm diameter (press down 3 times). The stamper was then removed and the photopaper was peeled off the coat and dried. The samples were irradiated in a Suntest instrument (from Atlas, model CPS+, black panel standard 75° C., light intensity 765 W/m², no filter) for a total period of 214 hours. Chalking was assessed by visual inspection.

Chalking was assessed on the following scale:
0=6% of pigment particles on photopaper
1=17% of pigment particles on photopaper
2=23% of pigment particles on photopaper
3=30% of pigment particles on photopaper
4=54% of pigment particles on photopaper
5=74% of pigment particles on photopaper.

Blank tests were carried out for degrading the polymers by UV irradiation with addition of a standard photocatalyst (Degussa P25) instead of the inventive layered photocatalyst.

Blank tests were also carried out for degrading organic materials by UV irradiation without addition of a photocatalyst. The results are reported in Table 5.

TABLE 5

| Wall paint sample II | Chalking |
|---|---|
| Blank sample (without catalyst) | 0 |
| Wall paint II with standard photocatalyst Degussa P25 | 3 |
| Wall paint II with inventive $SiO_2$-coated $TiO_2$ photocatalyst | 0 |

Example 6

Production of an Inventive Coating for Textiles I

TABLE 6

Production of textile coating I

| No. | Ingredient | Function | Amount in parts by weight |
|---|---|---|---|
| 1 | Water | Solvent | 153 |
| 2 | 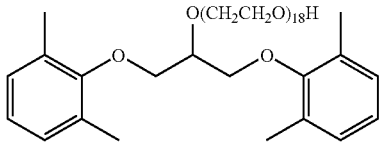 | Emulsifier | 2 |
| 3 | 51% by weight solution of a reaction product of hexamethyl diisocyanate with n-$C_{18}H_{37}(OCH_2CH_2)_{15}OH$ in isopropanol/water (2:3 by volume) | Defoamer | 3 |
| 4 | Ammonia (25%) | pH control | 2 |
| 5 | Random emulsion copolymer of (in parts by weight): ethyl acrylate 70, butyl acrylate 15, acrylonitrile 10, acrylamide 2.6, methylolacrylamide 1.9 are each based on total solids, weight average particle diameter 180 nm, determined by Coulter Counter, Tg = 9° C., molecular weight = 5000, solids content 51% | Acrylate dispersion | 800 |
| 6 | Titanium dioxide | Pigment/photocatalyst | 28 |
| 7 | 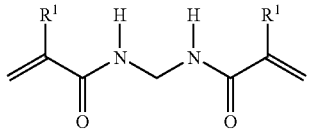<br>Synthetic thickener composed of copolymer of 85% to 95% by weight of acrylic acid, 4% to 14% by weight of acrylamide and 0.01% to not more than 1% by weight of the (meth)acrylamide derivative having molecular weights in the range from 100000 to 2000000 g/mol, in each of which the $R^1$ radicals can be the same or different and can be methyl or hydrogen. | Thickener | 12 |
| | Total | | 1000 |

The inventive photocatalyst used was $TiO_2$ in the anatase form in the core, surrounded by porous $SiO_2$ as envelope. The diameter of the core was 20-30 nm, the thickness of the envelope was 1 to 2 nm. The amount of Si based on the entire particle was 0.9% by weight.

The photocatalyst was incorporated into the coating material (stirred for 20 minutes at Ultraturrax 1500 rpm) and applied with a knife to a textile (cotton twill). The thickness of the coating was 0.3 mm. The layer was dried at 100° C. for 2 minutes and cured at 150° C. for 2 minutes.

Blank tests were carried out with addition of a standard photocatalyst (Degussa P25).

Blank tests were also carried out without photocatalyst but with addition of a titanium dioxide pigment in the rutile form.

Example 7

Production of Inventive Coating for Textiles II

TABLE 7

| | Production of textile coating II | | |
|---|---|---|---|
| No. | Ingredient | Function | Amount in parts by weight |
| 1 | Water | Solvent | 128 |
| 2 | 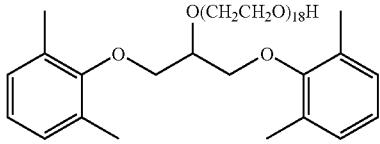 | Emulsifier | 2 |
| 3 | $Al(OH)_3$, $Al_2O_3$ | $Al(OH)_3$, $Al_2O_3$ | 80 |
| 4 | Ammonia (25%) | pH control | 2 |
| 5 | Random emulsion copolymer of (in parts by weight): ethyl acrylate 70, butyl acrylate 15, acrylonitrile 10, acrylamide 2.6, methylolacrylamide 1.9 are each based on total solids, weight average particle diameter 180 nm, determined by Coulter Counter, Tg = 9° C., molecular weight = 5000, solids content 51% by weight | Acrylate dispersion | 700 |
| 6 | Titanium dioxide | Pigment/photocatalyst | 40 |
| 7 | Polymer based on: 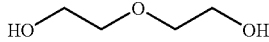 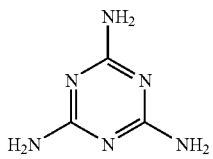  | Fixative | 5 |
| 8 | 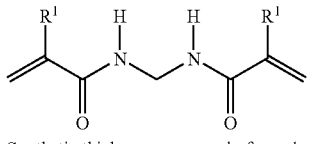 Synthetic thickener composed of copolymer of 85% to 95% by weight of acrylic acid, 4% to 14% by weight of acrylamide and 0.01% to not more than 1% by weight of the (meth)acrylamide derivative having molecular weights in the range from 100000 to 2000000 g/mol, in each of which the $R^1$ radicals can be the same or different and can be methyl or hydrogen. | Thickener | 8 |
| 9 | Disodium 4-(octadecilamino)-4-oxo-2-sulfonate butyrate, aqueous solution, solids content 40% by weight. | Foamer | 2 |
| 10 | Ammonium stearate | Foamer | 33 |
| | Total | | 1000 |

The inventive photocatalyst used was $TiO_2$ in the anatase form in the core, surrounded by porous $SiO_2$ as envelope. The diameter of the core is 20-30 nm, the thickness of the envelope was 1 to 2 nm. The amount of Si based on the entire particle was 0.8% by weight.

The photocatalyst was incorporated in the coating material (stirred for 20 minutes at Ultraturrax 1500 rpm) and applied with a knife to a textile (cotton twill). The thickness of the coating was 1.0 mm. The layer was dried at 110° C. for 3 minutes and at 150° C. for 5 minutes.

Blank tests were carried out with addition of a standard photocatalyst (Degussa P25).

Blank tests were also carried out without photocatalyst but with addition of a titanium dioxide pigment in the rutile form.

Example 9

Photoactivity of Coated Textile Surfaces

The photoactivities of the inventive textile coatings I and II were determined via the decolorization of a methylene blue solution. 10 µL of methylene blue solutions having concentrations of 10, 25 and 100 µmol/L were applied to the coated surface of the textile. The textile thus coated was in each case irradiated with UV light (light intensity 1.5 mW/cm$^2$). The decolorization of the methylene blue dye was observed visually over time.

Blank tests were carried out to decolorize the methylene blue by UV irradiation with addition of a standard photocatalyst (Degussa P25).

Blank tests were also carried out to decolorize the methylene blue by UV irradiation without photocatalyst but with addition of a titanium dioxide pigment in the rutile form.

| | Time to complete decolorization | | |
| --- | --- | --- | --- |
| Textile sample | 10 µmol/L MB solution | 25 mol/L MB solution | 100 µmol/L MB solution |
| Blank sample (textile coating II without photocatalyst) | 5 days | 10 days | Not completely decolorized |
| Textile coating II with standard catalyst Degussa P25 | 1 hour | 5 hours | Not completely decolorized |
| Textile coating II with inventive SiO$_2$-coated TiO$_2$ photocatalyst | 1 hour | 3 hours | 6 weeks |
| Textile coating I with inventive SiO$_2$-coated TiO$_2$ photocatalyst | 7 hours | 3 days | 9 weeks |

We claim:

1. A coating material comprising
(A) at least one binder as component (A) and
(B) at least one photocatalytically active particle comprising a non-porous core comprising at least one metal- or semimetal oxide having a diameter of 0.1 nm to 1 µm and at least one porous envelope at least partly surrounding the core and comprising at least one further metal- or semimetal oxide having an average layer thickness of 0.1 to 10 nm as component (B), wherein the ratio of the proportion of metal or semimetal in the envelope in atom percent to the proportion of metal or semi-metal in the core in atom percent is 2 to 80.

2. The coating material according to claim 1, wherein component (A) is selected from the group consisting of water- and/or organic solvent-based plastics dispersions based on nonpolymeric crosslinking systems, acrylates, caprolactam, vinylcaprolactam, N-vinylformamide, acrylic esters, styrene/acrylic esters and vinyl acetates, polyurethanes, epoxy resins, alkyd resins and mixtures thereof.

3. The coating material according to claim 2, wherein component (B) has a core of $TiO_2$ and an envelope of $SiO_2$.

4. The coating material according to claim 3, wherein the $TiO_2$ is essentially in the anatase form.

5. The coating material according to claim 4, further comprising component (C) wherein component (C) is at least one pigment selected from the group consisting of titanium dioxide, barium sulfate, zinc oxide, colored pigments, carbon black, zinc yellow, zinc green, ultramarine, luminescent or fluorescent pigments, azo pigments, isoindolinone pigments, isoindoline pigments, phthalocyanine pigments, quinacridone pigments, perinone pigments, perylene pigments, anthraquinone pigments, diketopyrrolopyrrole pigments, thioindigo pigments, dioxazine pigments, triphenylmethane pigments, quinophthalone pigments and mixtures thereof.

6. The coating material according to claim 5, wherein component (B) is active with regard to soils and nonactive with regard to matrix materials.

7. The coating material according to claim 1, wherein component (B) has a core of $TiO_2$ and an envelope of $SiO_2$.

8. The coating material according to claim 7, wherein the $TiO_2$ is essentially in the anatase form.

9. The coating material according to claim 1, further comprising component (C) wherein component (C) is at least one pigment selected from the group consisting of titanium dioxide, barium sulfate, zinc oxide, colored pigments, carbon black, zinc yellow, zinc green, ultramarine, luminescent or fluorescent pigments, azo pigments, isoindolinone pigments, isoindoline pigments, phthalocyanine pigments, quinacridone pigments, perinone pigments, perylene pigments, anthraquinone pigments, diketopyrrolopyrrole pigments, thioindigo pigments, dioxazine pigments, triphenylmethane pigments, quinophthalone pigments and mixtures thereof.

10. The coating material according to claim 1, wherein component (B) is active with regard to soils and nonactive with regard to matrix materials.

11. A process for producing the coating according to claim 1, which comprises mixing components (A) and (B).

12. The method of using the coating material according to claim 1, for coating metallic, organic and inorganic materials for interior and exterior applications in building construction chemistry.

13. A method for a coating metallic material, an organic material or an inorganic material which comprises coating the material with the coating material according to claim 1.

14. The method of coating a textile which comprises coating a textile with the coating material according to claim 1.

15. The method of using the coating material according to claim 1 for coating metallic, organic and inorganic materials for interior and exterior applications for technical apparatus.

16. The method of using the coating material according to claim 1 in applications comprising soil-degrading, deodorizing, air-cleaning, water-cleaning, antibacterial, superhydrophilicizing and/or antifogging effects.

17. The coating material according to claim 1, wherein the ratio of the proportion of metal or semimetal in the envelope in atom percent to the proportion of metal or semi-metal in the core in atom percent is 5 to 60.

18. The coating material according to claim 1, wherein the ratio of the proportion of metal or semimetal in the envelope in atom percent to the proportion of metal or semi-metal in the core in atom percent is 8 to 40.

* * * * *